2,943,977
INSECTICIDAL COMPOSITION COMPRISING 2,2,4,4,6,6 - TRIS (TETRAMETHYLENE) - 1,3,5 - TRITHIANE AND 2,2,4,4,6,6 TRIS(PENTAMETHYLENE) 1,3,5-TRITHIANE

Francis T. Wadsworth, Dickinson, and Paul D. May, Galveston, Tex., assignors to The American Oil Company, Texas City, Tex., a corporation of Texas No Drawing. Filed May 12, 1958, Ser. No. 734,425

6 Claims. (Cl. 167—33)

The present invention relates to insecticidal compositions and methods for destroying insects, particularly those insects which are of the sucking type.

It has been found that 2,2,4,4,6,6-tris(tetramethylene)-1,3,5-trithiane and 2,2,4,4,6,6-tris(pentamethylene)-1,3,5-trithiane are highly effective in destroying insects, particularly insects which are of the sucking type such as mites, aphids and the like. In destroying such insects, the insecticides of this invention are applied to the vegetation. The insecticides increase the resistance of the treated vegetation to damage by the sucking insects, inasmuch as the insects which infest the treated vegetation become poisoned and destroyed by the insecticide. The insecticide is typically applied to the leaves or foliage of vegetation, and it may conveniently be applied by spraying the foliage with water containing the insecticide in an amount between about 0.001 and 1.0% by weight. The invention thus includes the treatment of vegetation to increase the resistance thereof to damage by insects of the sucking variety and also includes compositions which are useful for such a purpose. The compositions include 2,2,4,4,6,6-tris(tetramethylene) - 1,3,5 - trithiane, 2,2,4,4,6,6 - tris-(pentamethylene)-1,3,5-trithiane, and mixtures thereof which have been diluted with water to a concentration between 0.001% and 1.0% by weight, and concentrates which are useful in forming such dilute compositions. A composition such as contains between 10 to 50% by weight of the trithiane, between about 1 to 15% by weight of an emulsifier, and the remainder a hydrocarbon distillate is exemplary of concentrates which may be diluted with water to form the composition containing between 0.001% and 1.0% by weight of the trithiane which is applied to the vegetation.

The 2,2,4,4,6,6-tris(tetramethylene)-1,3,5-trithiane has the following structural formula:

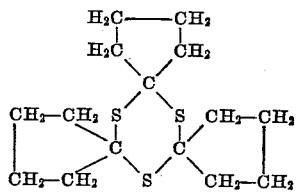

It may be prepared by slowly adding hydrogen sulfide and gaseous hydrogen chloride to cyclopentanone at about 0° C. and recovering the crystalline product which has a melting point of about 99° C. The 2,2,4,4,6,6-tris-(pentamethylene)1,3,5-trithiane has the following structural formula:

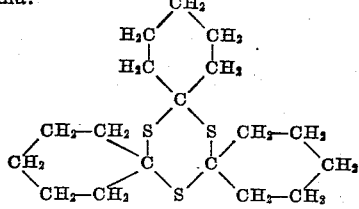

It may be prepared by slowly adding hydrogen sulfide and gaseous hydrogen chloride to cyclohexanone at about 0° C. and recovering the crystalline product which has a melting point of about 101° C.

Sucking-type insects are quite harmful to vegetation since they extract juices from the leaves and frequently stunt or cause destruction of the vegetation. Trees, shrubs, vegetable plants, and the many varieties of such vegetation are seriously damaged by this type of insect. Fruit and vegetable crops are reduced in size because of the damage caused by such insects. Typical of this variety of insect are those of the homoptera group which include aphids, scale insects, cicada, leafhoppers, spittle bugs, those of the hemiptera group such as squash bugs, stink bugs, milkweed bugs, and others such as mites and the like.

When the trithiane is applied to the vegetation, it is effective in destroying the sucking variety of insects and therefore increases the resistance of the treated vegetation to damage by the insects. It is believed that the insecticide functions as a contact poison, the insect being destroyed by coming in contact with the trithiane. The insecticide may be applied to the vegetation either during the dormant stage of the vegetation or during its stage of active growth. It is generally preferred to apply this type of insecticide to vegetation during its stage of active growth. This may be done by diluting the insecticide with water until the concentration of the insecticide in water is between 0.001% and 1.0% by weight, and then applying this water diluted insecticide by spraying or other suitable technique to the leaves of the vegetation, usually in amounts to completely wet the leaves. Greater or lesser concentrations may be used, depending upon the particular insect which is to be destroyed, variations in spraying techniques, weather conditions, etc. Typically a concentration of from 0.01 to 0.1% by weight of the insecticide in water will be satisfactory for destroying a wide variety of insects of the sucking type.

For purposes of commercial distribution it is desirable to have a concentrate of the insecticide which may be easily diluted with water to form the aqueous composition which is applied. Typical of such concentrates is one containing between about 10% to 50% by weight of the trithiane, between about 1 to 15% by weight of an emulsifier, and the remainder a hydrocarbon distillate. The trithianes are oil-soluble and an emulsifier is desirable in order to emulsify the trithiane and oil in the water, forming an oil-in-water emulsion. Any emulsifier which functions in such manner can be used. A typical emulsifier is Tween 80, which is a fatty acid ester of anhydrosoributol which has been condensed with ethylene oxide. Span 80, Victawet 12, and many other non-ionic emulsifying agents in addition to the Tween 80 may also be used for this purpose. Various anionic and cationic emulsifiers may also be employed. The hydrocarbon distillate used in the concentrate is one such as a petroleum distillate. Although wide varieties of petroleum distillates may be used, a petroleum oil which is relatively free of aromatics or has only a low concentration thereof is somewhat preferred. After this concentrate is diluted with water it is then applied to the vegetation, particularly to the leaves thereof, by typical spraying means such as mechanical ground sprayers, hand sprayers, etc.

Since the insecticide is a solid at atmospheric temperatures, it may be applied to the vegetation by dusting techniques. This is commercially done by mixing the insecticide with an inert powder and then distributing the diluted powdered insecticide by mechanical means from the ground or from the air.

When the insecticide is applied to the vegetation during its dormant period, such as during the winter time, this may conveniently be done by adding the insecticide to a dormant oil and then spraying the latter onto bark of trees, shrubs or the like beneath which the insects gather. Any conventional dormant oil, i.e. a hydrocarbon distillate which is low in aromatics, may be used. The insecticide may be contained in the oil in amounts between 0.001% and 1.0% by weight, as hereinabove discussed.

*Example 1*

Leaves were infested with green peach aphids. The leaves infested with the aphids were then sprayed until dripping wet, using an aqueous solution containing 0.1% by weight of 2,2,4,4,6,6-tris(tetramethylene)-1,3,5-trithiane. Approximately 24 hours later the leaves were examined under a microscope and it was found that an average of 100% of the aphids on the treated leaves had been destroyed.

*Example 2*

Another set of leaves was infested with two-spotted mites. The leaves were then sprayed until dripping wet, using an aqueous solution containing 0.0125% by weight of 2,2,4,4,6,6-tris(tetramethylene)-1,3,5-trithiane. Approximately 24 hours later the treated leaves were examined under a microscope. It was found that an average of about 90% of the two-spotted mites had been destroyed by the treatment.

*Example 3*

Leaves infested with green peach aphids were sprayed until dripping wet, using an aqueous solution containing 0.1% by weight of 2,2,4,4,6,6-tris(pentamethylene)-1,3,5-trithiane. Approximately 24 hours later the leaves were examined under a microscope and it was found that an average of about 91% of the aphids on the treated leaves had been destroyed.

*Example 4*

Leaves infested with two-spotted mites were sprayed until dripping wet, using an aqueous solution containing 0.025% by weight of 2,2,4,4,6,6-tris(pentamethylene)-1,3,5-trithiane. Approximately 24 hours later the treated leaves were examined under a microscope. It was found that an average of about 90% of the two-spotted mites had been destroyed by the treatment.

The above examples are not intended as limiting the scope of the invention, but are merely illustrative of the effectiveness of the insecticides when used on typical varieties of the sucking-type insects.

What is claimed is:
1. A method for increasing the resistance of vegetation to damage by sucking insects which comprises applying a trithiane selected from the group consisting of 2,2,4,4,6,6 - tris(tetramethylene) - 1,3,5 - trithiane, 2,2,4,4,6,6-tris(pentamethylene)-1,3,5-trithiane, and mixtures thereof to the vegetation.
2. The method of claim 1 wherein the trithiane is applied by spraying water containing between 0.001% and 1.0% by weight of the trithiane on the leaves of the vegetation.
3. The method of claim 1 wherein the trithiane is applied by spraying a low aromatics content distillate containing between 0.001% and 1.0% by weight of the trithiane to the bark of vegetation during the dormant stage of the latter.
4. The method of destroying sucking insects which comprises contacting such insects with a trithiane selected from the group consisting of 2,2,4,4,6,6-tris(tetramethylene) - 1,3,5 - trithiane, 2,2,4,4,6,6 - tris(pentamethylene)-1,3,5-trithiane, and mixtures thereof.
5. A composition useful for destroying sucking-type insects which comprises a trithiane selected from the group consisting of 2,2,4,4,6,6-tris(tetramethylene)-1,3,5-trithiane, 2,2,4,4,6,6-tris(pentamethylene)-1,3,5-trithiane, and mixtures thereof diluted with water to a trithiane concentration between about 0.001% and 1.0% by weight.
6. A concentrate useful in forming insecticidal compositions effective against sucking-type insects which comprises between about 10 to 50% by weight of a trithiane selected from the group consisting of 2,2,4,4,6,6-tris(tetramethylene)-1,3,5-trithiane, 2,2,4,4,6,6-tris(pentamethylene)-1,3,5-trithiane, and mixtures thereof, between about 1 to 15% by weight of an emulsifier, and the remainder a hydrocarbon distillate, said concentrate being capable of dilution with water to form an insecticidal composition containing between about 0.001% and 1.0% by weight of the trithiane.

References Cited in the file of this patent
UNITED STATES PATENTS
2,690,988    Jones et al. _____ Oct. 5, 1954
OTHER REFERENCES
Frear: A Catalogue of Insecticides and Fungicides, vol. I, 1947, p. 160.